Jan. 4, 1972     K. L. KNOX ET AL     3,632,726
APPARATUS FOR AND METHOD OF MAKING DIMENSIONALLY STABLE, FLAT
PLASTIC FILM AND THE FILM MADE THEREBY
Filed April 14, 1969     2 Sheets-Sheet 1
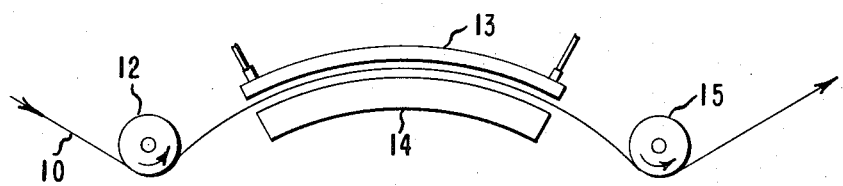
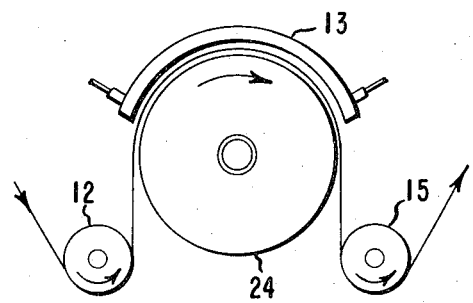
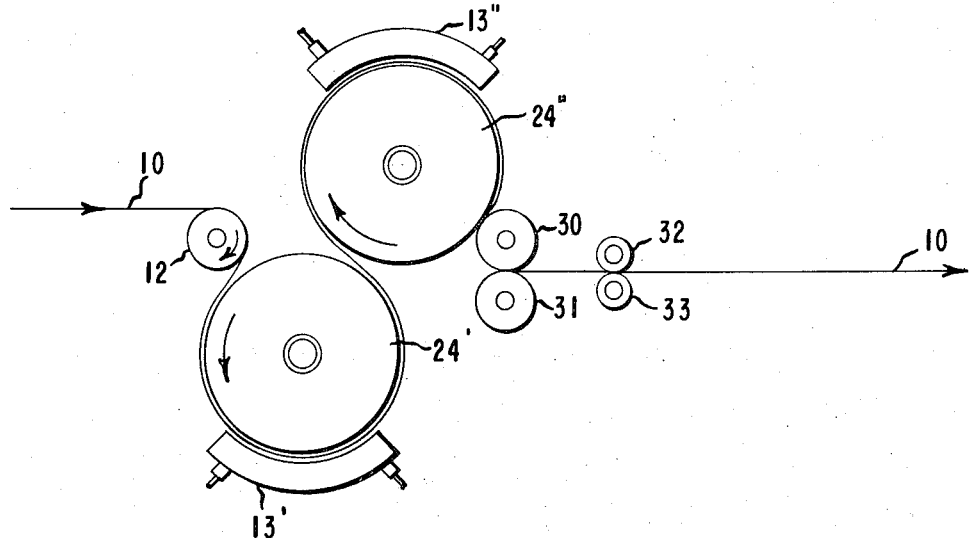
*INVENTORS*
KENNETH L. KNOX
CHARLES N. JOLLIFFE
BY *Hoge C. Sutherland*
ATTORNEY Jan. 4, 1972  K. L. KNOX ET AL  3,632,726
APPARATUS FOR AND METHOD OF MAKING DIMENSIONALLY STABLE, FLAT
PLASTIC FILM AND THE FILM MADE THEREBY
Filed April 14, 1969  2 Sheets-Sheet 2
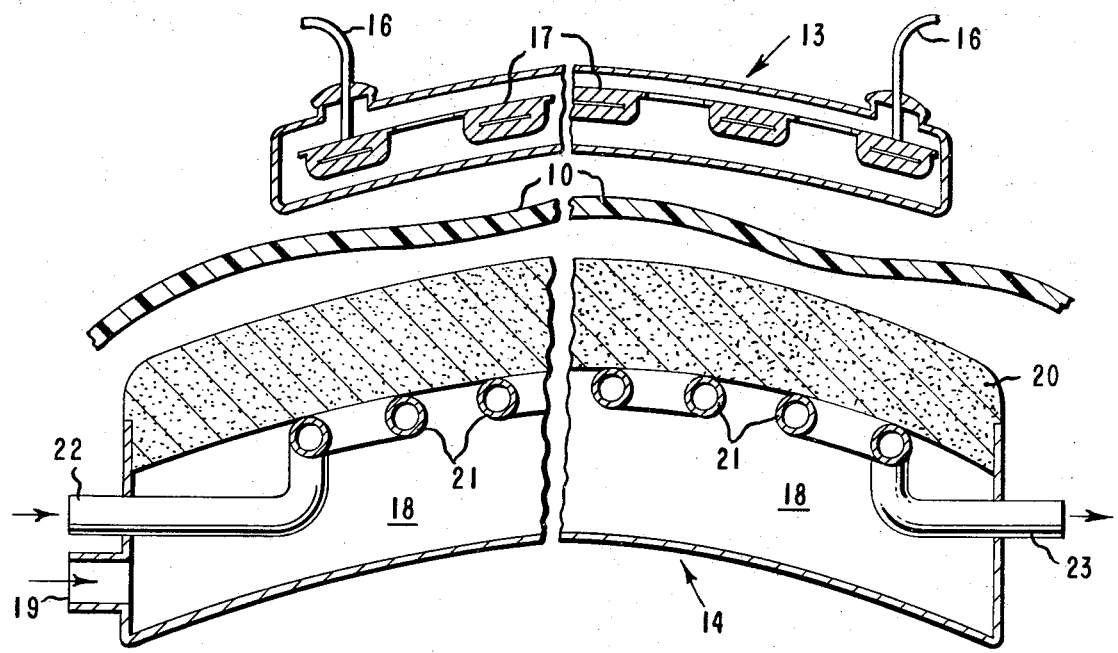
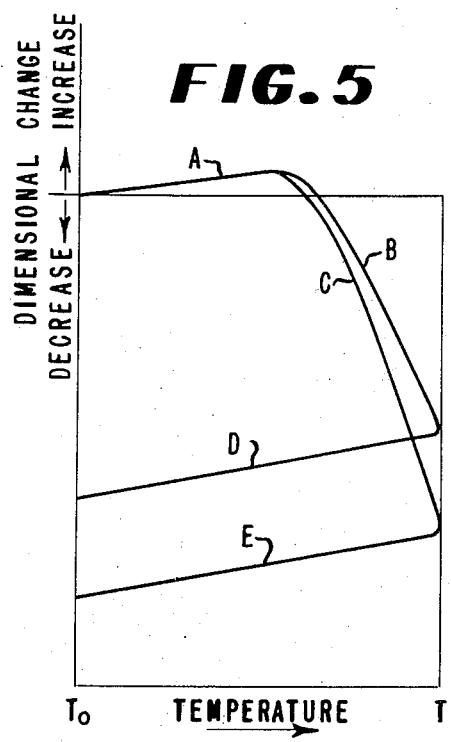
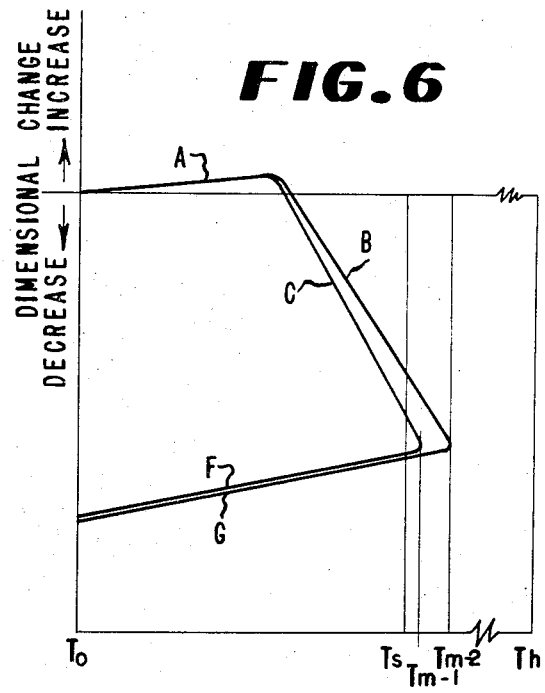
INVENTORS
KENNETH L. KNOX
CHARLES N. JOLLIFFE
BY *Hoge O. Sutherland*
ATTORNEY United States Patent Office
3,632,726
Patented Jan. 4, 1972

---

3,632,726
APPARATUS FOR AND METHOD OF MAKING DIMENSIONALLY STABLE, FLAT PLASTIC FILM AND THE FILM MADE THEREBY
Kenneth L. Knox and Charles N. Jolliffe, Circleville, Ohio, assignors to E. I. du Pont de Nemours and Company, Wilmington, Del.
Filed Apr. 14, 1969, Ser. No. 815,742
Int. Cl. B29c 25/00
U.S. Cl. 264—230                                3 Claims

ABSTRACT OF THE DISCLOSURE

Method of improving the dimensional stability of a web of plastic film while maintaining or improving its flatness including the steps of moving the web under low tension continuously past a heat source and a heat sink which are positioned across from each other on opposite sides of the web; supporting the web out of contact with the heat source and the heat sink by buoying the web away from the surface of the heat sink with a layer of gas extending across the width of the web; and, heating the web to a predetermined stabilizing temperature while thus supported thereby to improve the dimensional stability of the web of plastic film.

Apparatus is provided for performing the above method.

Polyethylene terephthalate film made by this method will exhibit a shrinkage of not more than 0.1% when heated to a temperature of 105° C. for a period of 30 minutes.

BACKGROUND OF THE INVENTION

(1) Field of the invention

This invention is a method of and apparatus for making flat plastic film having improved dimensional stability in which a web of the film is heated to selectively shrink it while the web is supported by a cushion of air from contact with parts of the apparatus.

(2) Description of the prior art

There have been a number of attempts to dimensionally stabilize plastic film by heating it.

It is known, for example, to heat a web of plastic film to shrink it and thereby stabilize it by conduction heating wherein the web contacts the heat source, by radiant heating wherein the web is exposed to radiation, or by convection heating wherein hot gas is blown against the web. These methods either tend to damage the film being shrunk due to contact between the film and the heat source or shrink the film in a nonselective manner which leads to wrinkles or nonflat areas in the shrunken film.

British Pat. 1,000,361 to Yumoto et al. is directed by improvements in polyethylene terephthalate films and discloses a method of improving dimensional stability of such films comprising subjecting the film after stretching to a first heat treatment at a temperature of 150° to 250° C. while maintaining the film under tension and its dimensions substantially constant, and thereafter subjecting the heat-treated film to a second heat treatment at a temperature in the range of 150 to 250° C. while allowing the film to be relaxed along its dimensions by from 2 to 30%. The film is heated by hot air or by an infrared heater. The resulting film has a thermal shrinkage of not more than 1%.

U.S. Pat. 2,540,986 to Klein et al. discloses apparatus for preshrinking crystalline vinylidene chloride copolymer film by exposing the oriented film to a heated inert liquid as the film is fed under rolls positioned within the heated liquid. Tension rolls are provided on each side of successive heated compartments containing the heated liquid and the film is passed through four or more of such compartments.

U.S. Pat. 2,779,684 to Alles is directed to polyester films and their preparation and discloses a method of making dimensionally stable polyester film including the step of modifying a heat-set film by heating it in a heat-relaxing zone to a temperature of 110° C. to 150° C. for a period of 1 to 3 minutes while maintaining the film under slight tension whereby internal stresses are relaxed. The heat-relaxing zone is heated near the entrance by infrared lamps or electrically heated platens and then by hot air or superheated steam. Film made by this method will not shrink more than 0.2% in dimensions when heated to 120° C. for a period of 5 minutes.

While all these patents are directed to the dimensional stabilization of plastic film by application of heat, none of them shows such heat application occurring as the film is held out of contact with the heat source or other apparatus parts by a pillow of air.

U.S. Pat. 2,689,196 to Daniels shows a web dryer wherein portions of the web pass over and are guided without contact past drum areas having a plurality of openings through which air is forcibly ejected to form a pneumatic cushion between the drum areas and the web. This apparatus prevents harmful contact with the machine surfaces harmful to the web, such as contact of the moist coated portions of such web with the drum. Specifically, the apparatus is directed to drying fabric and paper webs, the surfaces of which have been coated or treated.

U.S. Pat. 3,061,940 to Cichelli discloses a method and apparatus for heat transfer to a running web without the necessity for surface contact therewith by supporting the web by blowing air through a previous heat exchanger. The thickness of the gas layer between the heat exchanger and web is not more than 10 mils.

While these patents show heating applications applied while a web is being cushioned by air, they do not show heating to obtain dimensional stability in a plastic web by passing the web between a heat source and a heat sink with the web being supported by an air cushion during heating, in a manner still maintaining web flatness to be further explained, as in the instant invention.

SUMMARY OF THE INVENTION

This invention is a method of and apparatus for making plastic films having improved dimensional stability.

Briefly stated, such method, in a preferred embodiment comprises, in combination, the steps of (1) subjecting an oriented film which has been oriented by stretching to a novel heat treatment at a predetermined temperature for a predetermined time to shrink the film selectively and (2) supporting the film by an air cushion during the heat treatment whereby to produce a substantially flat film having improved dimensional stability.

In the development of plastic films for a variety of uses, it is known to improve the strength characteristics of the films by stretching them at least in one direction and preferably in both the machine and cross machine directions. It is further known that such an oriented film has a tendency when exposed to somewhat elevated temperatures either during subsequent processing or under use conditions to retract or shrink toward its original dimensions prior to the stretching of the film. This is true even when the oriented films have been heat set, since it is common to carry out the heat setting under restraint. This shrinkage is a problem not only because of the gross dimensional change, but a degree of nonuniformity is almost always present which leads to wrinkles or buckles and, hence, film which is not flat.

For some purposes heat shrinkability is desired but in many applications such behavior greatly interferes with the acceptability of the films. For example, in heat sealing a biaxially oriented film there is considerable puckering of the film at the seals and an unsightly and unsatisfactory package results. Also, packages overwrapped with such films tend to distort and pucker when subjected to temperature changes. Hence, the ability of the particular film used in these applications to maintain its basic dimensions under heat is of great importance.

Dimensional stability also is particularly important in the areas of graphic arts, such as drafting films, and in information transfer, such as photographic films, and magnetic tapes.

Still another important film characteristic is sheet flatness. It has been found that sheet flatness is a highly essential requirement in a film to be processed satisfactorily or to be used in various commercial applications. Just as dimensional stability against changes in temperature is required in various processing steps, such as surface treating and coating, so also is sheet flatness important in assuring satisfactory sheet treatment in these processing steps. Further, flatness is of critical importance in such film use applications as printing or packaging.

This invention more specifically is directed to a method of and apparatus for dimensionally stabilizing film by heating it as it is supported on an air cushion, and particularly to a method and apparatus for heating a moving plastic web in a novel manner to stabilize it without the necessity for surface contact between the web and other parts of the apparatus as the web is heated.

Conventional methods for heating, moving or running webs may be classified generally in one of the three following categories:

(1) Heat exchange by conduction from a solid surface with which the web is in contact;

(2) Radiant heating, such as by exposure of the web to radiation of an infrared emitter; and, (3) Blowing a gas, such as heated air, into contact with the web thereby effecting heat transfer by convection between the web and the gas.

The method of heating a web selected for a particular use depends importantly on whether surface contact between the web and the heat transferring agency or source can be tolerated. The highest heat transfer rates are obtained where actual contact occurs, i.e., where heat exchange is accomplished by conduction. However, in many cases, surface damage to the web results from contact, as in the case of thermoplastic materials where the web material is appreciably softened by exposure to heat. It may also result that scratching of the web occurs upon contact with a solid surface and, of course, many materials exhibit a sticking tendency, especially at higher temperatures, which makes it inadvisable to bring them into contact with any solid surfaces at least until after the heat transfer has been effected.

Further, various portions of a given web of plastic film may exhibit a pronounced tendency to shrink more than other portions of the web; hence, when the web is heated by directly contacting it with a constant heat source, these portions shrink more than the other portions thereby causing excessive wrinkling of the web. This wrinkling also will occur if the web is heated by a single constant heat source spaced a set distance from the moving web as it moves in a predetermined path, always substantially the same distance from the heat source, in a free span, for example.

This invention provides a means for continuously and selectively moving portions of the web away from the constant heat source when they shrink to their desired level and the web is stabilized. The shrinking of the web itself moves these portions away from the heat source and leads the web to seek a flat state after stabilization.

More specifically, this invention is directed to the improvement of the dimensional stability and flatness of thermoplastic linear polyester films, such as polyethylene terephthalate film.

Polyethylene terephthalate film which has been biaxially oriented and heat set may show a residual shrinkage of more than 0.5% at 105° C. This is a larger dimensional change than can be tolerated in a number of uses particularly if the film is nonflat or distorted. By following the method of this invention and using the novel apparatus thereof, shrinkage of such film is drastically and dramatically reduced; the end result being a novel film having satisfactory flatness and being sufficiently dimensionally stable to meet untold numbers of use requirements.

DESCRIPTION OF THE DRAWINGS

FIG. 1 is a perspective diagrammatic view of parts of the apparatus of this invention showing a web of plastic film as it moves under a tension roll and past and between an arcuate stationary heat source and an arcuate stationary heat sink whereat the web is stabilized dimensionally, still maintaining its flatness and, hence, under another tension roll;

FIG. 2 is a perspective diagrammatic view of parts of a modified apparatus of this invention in which the heat sink is a roll;

FIG. 3 is a perspective diagrammatic view of another modified apparatus of this invention showing a plurality of heat sources and heat sinks for dimensionally stabilizing a web of plastic film;

FIG. 4 is a plan view showing, in exaggerated form and with parts omitted for clarity, the heat source and heat sink of FIG. 1 with the web of plastic film being shown in various positions therebetween, such positions being dependent upon the amount portions of the web have shrunk at a given time;

FIG. 5 is a graph showing the effect of typical stabilization of a plastic web at a fixed uniform temperature as practiced in the prior art; and, FIG. 6 is a graph showing the effects of plastic web stabilization in accordance with the present invention.

DESCRIPTION OF THE PREFERRED
EMBODIMENTS

Referring to FIG. 1, in the practice of this invention, a web of plastic film 10 from forming equipment or a supply roll (not shown) is fed under a tension or guide roll 12 and past and between a heat source 13 and a heat sink 14 where it is heated to stabilize it dimensionally. After heating the web 10 is fed under a tension or guide roll 15 and onto a windup roll or to a use station (not shown).

Both the heat source 13 and the heat sink 14 have generally arcuate configurations and the web 10 is moved or fed so that it does not contact either of their surfaces. Generally, while moving, the web is less than 10 mils from the heat sink surface and ½ of an inch or further from the heat source surface.

The heat source 13 shown is of the radiant type consisting of electrical leads 16 connected to bar heaters 17. If desired, any other suitable type of heat source may be used. The heat sink 14 consists of a plenum chamber 18 supplied with buoying gas under pressure through a supply line 19. In the event that the film 10 might be deleteriously affected by air, the gas utilized may be nitrogen, helium or some other inert gas, it being understood that the word "gas" as employed herein is intended to comprehend vapor such as superheated steam, as well.

The top side of plenum chamber 18 is closed off by a porous or foraminous wall 20 which is fabricated from a gas-pervious material such as a sintered metal, e.g., sintered bronze or the like. Instead of sintered metal other gas-pervious structures may be employed. To maintain the temperature of the wall 20 at the desired level, the wall is provided with coils 21 which are supplied with steam or coolant through an inlet line 22 and from which condensate is withdrawn through an outlet line 23. Heater coils 21 are preferably brazed or otherwise firmly attached to wall 20, thereby insuring good heat conduction to the gas-pervious mass.

The buoying gas is distributed evenly over the outer upper surface of the heat sink 14 confronting the web 10 by divided flow through the multiplicity of interstices in the porous wall 20 and the film of gas formed next to the web is substantially even in thickness, so as to support the web 10 out of any contact with the wall 20 of the heat sink 14.

In essence, in this invention the web 10 is "floated" by the gas layer over the external surface of wall 20 of the heat sink 14 and out of contact therewith, while at the same time being heated by the heat source 13 as a function of the linear speed of the web past the heat source. Since there is practically zero friction in the travel of the web past the heat source only a low tension need be applied to the web in its transit past the heat transfer apparatus.

The use of a porous surface with gas flowing through the surface is particularly useful for low speeds of operation. This is not necessary at higher speeds as the moving film 10 will carry with it sufficient air to lubricate the surface of the heat sink 14.

It is seen, therefore, that the web 10 may be supported out of contact with the heat sink 14 by a gas layer provided by forcing gas under pressure through the interstices in the wall 20 of the heat sink 14 or by a gas layer provided or generated by the high speed of the moving film 10 as it passes the heat sink 14.

The heat sink 14 and its surface need not be stationary, but may be a rotatable roll, such as 24, as shown in FIG. 2. The roll or drum 24 is suitably journaled for rotation and may also include connections for heat transfer fluid and a gas inlet.

Two or more heating operations may be performed on the plastic web 10 to stabilize it, as is shown in FIG. 3. A first heat source 13' is shown suitably positioned adjacent a heat sink roll 24' and a second heat sink 13" is shown positioned adjacent a second heat sink roll 24". In general, it is preferred to use a roll with a substantial diameter, for example 3 to 5 feet, as the radius affects the accuracy of location of the film with respect to the heat sink. Where several stages are used, the final stage is preferred to have the largest diameter and to operate at the highest temperature.

Although the apparatus of this invention provides a superior dimensionally stable film, a few small buckles or wrinkles may remain. These can be removed with a minor sacrifice in dimensional stability by drawing the film 10 or retensioning it in a manner to be explained.

As shown in FIG. 3, from the stabilizing zone or operation the film 10 is fed into the nip between take off roll 30 heated to a temperature below that of the stabilization temperature but above the anticipated use temperature of the film and a backup roll 31 which may be rubber covered. From there the web 10 is fed into the nip between rolls 32 and 33 which are driven at a rate faster than the rolls 30 and 31 are driven so that the film is drawn very slightly between the two sets of nip rolls. This draw might increase the web dimensions by up to 0.2%. The rolls 32 or 33 may be cooled if sufficient cooling does not occur between sets of nip rolls. The film so set will release the internal shifts from the draw upon reheating but this is small and meanwhile the appearance and flatness of the nonreheated film is improved.

OPERATION

The operation of the apparatus of this invention for dimensionally stabilizing plastic film while maintaining or enhancing its flatness is best seen in FIG. 4.

The untreated film 10 to be stabilized is moved between the heat source 13 and the heat sink 14 in a manner such that the portions of the film furthest from the heat sink 14 are heated hotter than the portions of film nearer the heat sink 14 and will shrink more. As shrinkage occurs the film 10 moves toward the heat sink 14, is cooled and the shrinkage halted.

Certain areas or portions of the web 10 of the film tend to shrink more than others. These portions, under the influence of the heat from the heat source 13, are heated to a first temperature and shrunk rapidly and move toward the heat sink 14 and thereupon reach their stabilized condition and their substantially flat and final position with respect to the heat sink, at which condition and position no further shrinking occurs. The other areas of the web 10 which have not shrunk as much as the first shrunk (stabilized) areas at this first temperature tend to buckle out toward the heat source 13 where they are heated hotter to a second temperature at which time these portions of the web 10 move away from the heat source 13 and to the same stabilized condition and position with respect to the heat sink 14 as the other first stabilized portions of the web 10, again at which time no further shrinkage occurs.

The gas layer between the film 10 and heat sink 14 lubricates the surface thereof, avoids scratches and other damages as the film 10 moves over the heat sink surface, and provides a thermal barrier so that the temperature reached by the film 10 is sensitive to the distance from the heat sink 14. The temperature of the heat sink 14 determines the minimum stabilizing temperature. Due to the location of the film 10 in the gap between the heat sink and heat source and depending upon heat transfer, film thickness, and tension the effective stabilization temperature will be higher than the minimum. For typical conditions the effective temperature might be 5° C. above the minimum.

The film 10 reaches its stabilizing temperature when it shrinks to a position a set distance above the heat sink 14 and, hence, to a position a set distance away from the heat source 13. In this self-seeking position, the web 10 is maintained in its substantially flat state and reaches a stabilizing temperature lower than the temperature of the heat source 13 and slightly, say by 5° C., higher than the temperature of the heat sink 14. It is at this position and temperature that the web 10 stabilizes dimensionally while maintaining its flatness.

Referring now to FIG. 5, prior art heating of plastic film for stabilization is shown. As the temperature is increased from $T_0$ to T, the region A of the film shows an increase in dimension. This is typical behavior based on the thermal coefficient of expansion and may occur in stretched polymers below the second order or "glass" transition temperature. As the temperature is further increased the stresses are released and shrinkage begins to occur as shown by curves B and C. The higher the temperature the greater is the shrinkage as additional internal stresses are released from the film. B and C differ in that they represent two regions or areas with different degrees of internal stress which consequently decrease dimensionally by different amounts. When temperature T is reached and the film is cooled (as shown in D and E) the cooling curves are parallel to the heating curve A and follow generally the expansion coefficient. Further heatings and coolings will take place along D and E provided the temperature T is not exceeded. Although the dimensions of the film may be said to be stabilized the differences between the shrinkage in the different areas causes buckling and distortion.

FIG. 6 shows dimensional changes of the film of this invention. The regions of heating A, B and C are the same as in FIG. 5. "$T_s$" is the temperature of the heat sink and "$T_h$" is the heater temperature. As a result of the heating, shrinkage of region C occurs until a first temperature of $T_{m-1}$ near $T_s$ is reached and the close proximity of C to the heat sink arrests further shrinkage. The region B which has not shrunk as much as region C tends to buckle out nearer the heater and reaches a hotter second temperature $T_{m-2}$ between $T_s$ and $T_h$ which causes it to undergo additional shrinkage and conform to the heat sink surface. $T_{m-2}$ is the maximum temperature to which film can be reheated without distortion. The cooling and reheating curves F and G are improved over D and E by having both dimensional stability and reduced buckle; i.e., the film is flatter.

The following examples illustrate the marked improvement in dimensional stability and sheet flatness to be realized by subjecting plastic film to the combination of steps which constitute the method of this invention.

EXAMPLE 1

A ½-inch wide 1-mil thick polyester film, available commercially under the trademark Mylar® Type A, owned by E. I. du Pont de Nemours and Company, was drawn over a heat sink in the form of a one inch diameter porous bronze cylinder. Air flow was maintained to barely support the film above the cylinder and maintain an air bearing or cushion for such film. The heat source was a ½-inch diameter cartridge heater with consumption of 100 watts per inch of width and it was red hot. The gap between heater and cylinder was about ¼-inch. The film was drawn at 3¾ inches per second over the porous cylinder and the tension was less than 100 pounds per square inch. The exposure time was about 0.2 second and the film shrank in conformance with the cylinder and was then wound up.

A strip of treated film 25 cm. long was loaded with a weight of 100 grams per inch of width. The length was measured with a cathetometer. The strip was hung unstressed in an air oven at 105° C. for 30 minutes. It was removed from the oven, cooled to room temperature and the length measured as before. The appearance of the treated film was better than untreated film. The film treated in accordance with this invention when tested under the above procedure shrank less than 0.1% while the untreated film shrank 0.5%, when tested under the same conditions.

EXAMPLE 2

The procedure of Example 1 was repeated with "Mylar"® polyester type T film which has a high length direction strength. The shrinkage at 105° C. was less than 0.1% for the treated stabilized film and 1.5% for the untreated film.

EXAMPLE 3

In order to demonstrate the importance of the heat sink gas cushion, the porous cylinder of Example 1 was removed and the run repeated. The film was badly distorted.

EXAMPLE 4

1.5 ml "Mylar"® A film 10 inches in width was passed over a steel platen with a radius of curvature greater than 100 ft. The platen was heated by radiant bar heaters spaced 3 inches from the platen and the film was moved at 7 feet per minute. Air was supplied at the leading edge of the platen through a porous block with just sufficient air to prevent contact of platen and film. With radiant heat the film was flat with a 105° C. shrinkage of 0.1% versus 0.7% for the untreated film. When the heaters were removed, the film was badly wrinkled.

EXAMPLE 5

The arrangement of Example 4 was used with 4-ml oriented heat-set polyethylene terephthalate film. The dimensional stability was improved but the stabilized film was not as flat as the untreated film. The film was passed at 4½ feet per minute between 2 sets of nip rolls heated to 75° C. under a slight tension. The flatness was improved as shown in Table I.

TABLE I

|  | Dimensional stability at 105° C., percent | | Flatness buckle count |
|---|---|---|---|
|  | MD | TD |  |
| Untreated film | 0.5 | 0.4 | 15 |
| Treated film (dimensionally stabilized) | 0.04 | 0.1 | 16 |
| Treated film (dimensionally stabilized and retensioned) | 0.24 | 0.18 | 3 |

The flatness buckle count was obtained by placing the film on a dark colored flat surface and observing by eye the reflections when the film is normally illuminated.

This invention is particularly concerned with improving the dimensional stability of polyester films, such as polyethylene terephthalate film.

In making such films, the casting or extrusion of the polyester into the form of a film and stretching the film can be accomplished in any conventional apparatus for this purpose. An especially useful film making stretching apparatus is described in U.S. Pat. 2,823,421 to Scarlett.

The polyester film may be composed of any polyester of the types described, for example, in U.S. Pat. 2,465,319 to Whinfield. Polyester films of this type have excellent strength and durability characteristics but tend to shrink abnormally at elevated temperatures. The film has good flatness characteristics irrespective of its lack of dimensional stability for high temperature uses.

It is known to preshrink this film to stabilize it dimensionally but the shrinking wrinkles the film and renders it nonflat. By following this invention, polyester films may be shrunk, while cushioned on air, to stabilize them while still maintaining, and even improving, the flatness of the basic untreated film. This is the touchstone of this invention.

We claim:
1. A method of improving the dimensional stability of an oriented web of plastic film including the steps of:
moving the web continuously past a heat source and a heat sink positioned on opposite sides of the web;
supporting the web out of contact with the heat sink and heat source by buoying the web away from the surface of the heat sink with a layer of gas extending across the width of the web; and,
heating the web to a predetermined temperature while the web is thus supported, wherein the portion of the dimensional stability, wherein the portions of the web closest to the heat source are heated hotter than other portions of the web as the web is moved whereby portions of the web are shrunk so as to substantially occupy a predetermined position above the heat sink, the temperatures of the heat source and heat sink being such that when the web is in this predetermined position it will be heated to a predetermined stabilizing temperature, such web being substantially flat in such predetermined position thereby to improve its dimensional stability.

2. The method of claim 1 further including the step of:
tensioning the web after heating thereby to improve its flatness.

3. The method of claim 1 wherein the film is oriented heat-set polyethylene terephthalate.

References Cited

UNITED STATES PATENTS

| | | | |
|---|---|---|---|
| 2,779,684 | 1/1957 | Alles | 117—7 |
| 2,987,767 | 6/1961 | Berry et al. | 264—95 |
| 3,342,573 | 9/1967 | Fredley et al. | 264—93 |

FOREIGN PATENTS 1,000,361  8/1965  Great Britain _____ 264—235

DONALD J. ARNOLD, Primary Examiner

G. AUVILLE, Assistant Examiner

U.S. Cl. X.R.

18—1 FS; 264—235, 237, 288, 342 RE, 346, 348